United States Patent
Ferris et al.

(10) Patent No.: US 8,504,443 B2
(45) Date of Patent: Aug. 6, 2013

(54) METHODS AND SYSTEMS FOR PRICING SOFTWARE INFRASTRUCTURE FOR A CLOUD COMPUTING ENVIRONMENT

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 439 days.

(21) Appl. No.: 12/551,517

(22) Filed: Aug. 31, 2009

(65) Prior Publication Data

US 2011/0055034 A1    Mar. 3, 2011

(51) Int. Cl.
*G06Q 30/00*   (2012.01)

(52) U.S. Cl.
USPC ............... 705/26.81; 705/26.1; 705/7.11

(58) Field of Classification Search
USPC .................................. 705/26–27.2
See application file for complete search history.

(56) References Cited

U.S. PATENT DOCUMENTS

| | | | |
|---|---|---|---|
| 6,367,077 B1 | 4/2002 | Brodersen et al. |
| 6,463,457 B1 | 10/2002 | Armentrout et al. |
| 6,578,199 B1 | 6/2003 | Tsou et al. |
| 7,313,796 B2 | 12/2007 | Hamilton et al. |
| 7,439,937 B2 | 10/2008 | Ben-Shachar et al. |
| 7,461,095 B2 | 12/2008 | Cohen et al. |
| 7,529,785 B1 | 5/2009 | Spertus et al. |
| 7,546,462 B2 | 6/2009 | Upton |
| 7,577,722 B1 | 8/2009 | Khandekar et al. |
| 7,596,620 B1 | 9/2009 | Colton et al. |
| 7,624,394 B1 | 11/2009 | Christopher, Jr. |
| 7,793,288 B2 | 9/2010 | Sameske |
| 7,886,038 B2 | 2/2011 | Ferris |
| 8,108,912 B2 | 1/2012 | Ferris |
| 2001/0039497 A1 | 11/2001 | Hubbard |
| 2002/0069276 A1 | 6/2002 | Hino et al. |
| 2002/0086688 A1 | 7/2002 | Kang |
| 2002/0129352 A1 | 9/2002 | Brodersen et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |

(Continued)

OTHER PUBLICATIONS

Robison, D. "Billing simulation tool for commercial buildings;" Nov. 7, 2001; Fairmont Press Inc., Strategic Planning for Energy and the Environment, Fall 2001, vol. 21, No. 2, pp. 47-65.*

(Continued)

*Primary Examiner* — Adam Levine
(74) *Attorney, Agent, or Firm* — Lowenstein Sandler LLP

(57) ABSTRACT

A software provider system can provide and price software infrastructure for a cloud to a cloud provider based on expected utilization and actual utilization of the cloud. The software provider system can provide the software infrastructure of the cloud and technical support for the software infrastructure under a varying price structure which is dependent on the expected utilization and the actual utilization of the software infrastructure. The software provider system can determine the initial price of the software infrastructure based on the expected utilization of the cloud and a purpose of the cloud. The software provider system can monitor the actual utilization of the software infrastructure, over time, in order to modify the initial price based on the actual utilization of the software infrastructure.

20 Claims, 6 Drawing Sheets

U.S. PATENT DOCUMENTS

| | | |
|---|---|---|
| 2005/0044541 A1 | 2/2005 | Parthasarathy et al. |
| 2005/0131898 A1 | 6/2005 | Fatula |
| 2005/0144060 A1 | 6/2005 | Chen et al. |
| 2005/0149447 A1* | 7/2005 | Sherkow .................... 705/52 |
| 2005/0182727 A1 | 8/2005 | Robert et al. |
| 2005/0262549 A1 | 11/2005 | Ritt et al. |
| 2005/0289540 A1 | 12/2005 | Nguyen et al. |
| 2006/0031598 A1 | 2/2006 | Blanchard et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2006/0277542 A1 | 12/2006 | Wipfel |
| 2007/0011291 A1 | 1/2007 | Mi et al. |
| 2007/0028001 A1 | 2/2007 | Phillips et al. |
| 2007/0074201 A1 | 3/2007 | Lee |
| 2007/0101116 A1 | 5/2007 | Tsuji |
| 2007/0168962 A1 | 7/2007 | Heinke et al. |
| 2007/0169079 A1 | 7/2007 | Keller et al. |
| 2007/0226715 A1 | 9/2007 | Kimura et al. |
| 2007/0245332 A1 | 10/2007 | Tal et al. |
| 2007/0283282 A1 | 12/2007 | Bonfiglio et al. |
| 2007/0294676 A1 | 12/2007 | Mellor et al. |
| 2008/0022271 A1 | 1/2008 | D'Angelo et al. |
| 2008/0052384 A1 | 2/2008 | Mari et al. |
| 2008/0080396 A1* | 4/2008 | Meijer et al. ............... 370/254 |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1* | 4/2008 | Meijer et al. ................ 726/9 |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2008/0256516 A1 | 10/2008 | Chaar et al. |
| 2009/0012885 A1 | 1/2009 | Cahn |
| 2009/0013061 A1 | 1/2009 | Winter et al. |
| 2009/0025006 A1 | 1/2009 | Waldspurger |
| 2009/0037496 A1 | 2/2009 | Chong et al. |
| 2009/0064086 A1 | 3/2009 | Faus |
| 2009/0089078 A1 | 4/2009 | Bursey |
| 2009/0089407 A1 | 4/2009 | Chalupa et al. |
| 2009/0099940 A1 | 4/2009 | Frederick et al. |
| 2009/0132695 A1 | 5/2009 | Surtani et al. |
| 2009/0144718 A1 | 6/2009 | Boggs |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0222806 A1 | 9/2009 | Faus |
| 2009/0222808 A1 | 9/2009 | Faus |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0249488 A1 | 10/2009 | Robinson et al. |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1* | 12/2009 | Ferris et al. .................... 705/418 |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300164 A1 | 12/2009 | Boggs |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300584 A1 | 12/2009 | Faus |
| 2009/0300593 A1 | 12/2009 | Faus |
| 2009/0300601 A1 | 12/2009 | Faus |
| 2009/0300607 A1 | 12/2009 | Ferris et al. |
| 2009/0300608 A1* | 12/2009 | Ferris et al. .................... 718/1 |
| 2009/0300635 A1 | 12/2009 | Ferris |
| 2009/0300641 A1 | 12/2009 | Friedman et al. |
| 2009/0300719 A1 | 12/2009 | Ferris |
| 2009/0327683 A1 | 12/2009 | Cabot et al. |
| 2010/0031234 A1 | 2/2010 | Chaar et al. |
| 2010/0042720 A1 | 2/2010 | Stienhans et al. |
| 2010/0050172 A1* | 2/2010 | Ferris .................... 718/1 |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1* | 8/2010 | Ferris .................... 709/226 |
| 2010/0218237 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan |
| 2010/0306377 A1 | 12/2010 | DeHaan |
| 2010/0306379 A1 | 12/2010 | Ferris |
| 2010/0306566 A1 | 12/2010 | DeHaan |
| 2010/0306765 A1 | 12/2010 | DeHaan |
| 2010/0306767 A1 | 12/2010 | DeHaan |
| 2011/0004676 A1 | 1/2011 | Kawato |
| 2011/0010420 A1 | 1/2011 | Kagitani |
| 2011/0016214 A1 | 1/2011 | Jackson |
| 2011/0055034 A1 | 3/2011 | Ferris |
| 2011/0055377 A1 | 3/2011 | DeHaan |
| 2011/0055378 A1 | 3/2011 | Ferris |
| 2011/0055396 A1 | 3/2011 | DeHaan |
| 2011/0055398 A1 | 3/2011 | DeHaan |
| 2011/0055588 A1 | 3/2011 | DeHaan |
| 2011/0107103 A1 | 5/2011 | DeHaan |
| 2011/0131134 A1 | 6/2011 | Ferris |
| 2011/0131306 A1 | 6/2011 | Ferris |
| 2011/0131315 A1 | 6/2011 | Ferris |
| 2011/0131316 A1 | 6/2011 | Ferris |
| 2011/0131335 A1 | 6/2011 | Spaltro et al. |
| 2011/0131499 A1 | 6/2011 | Ferris |
| 2011/0213686 A1 | 9/2011 | Ferris |
| 2011/0213687 A1 | 9/2011 | Ferris |
| 2011/0213691 A1 | 9/2011 | Ferris |
| 2011/0213713 A1 | 9/2011 | Ferris |
| 2011/0213719 A1 | 9/2011 | Ferris |
| 2011/0213875 A1 | 9/2011 | Ferris |
| 2011/0213884 A1 | 9/2011 | Ferris |
| 2011/0214124 A1 | 9/2011 | Ferris |

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferns et al., "Methods and Systems for Matching Resource Requests with Cloud Computing Environments", U.S. Appl. No. 12/714,113, filed Feb. 26, 2010.
Ferris et al., "Systems and Methods for Generating Gross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

White Paper—"rPath Versus Other Software Appliance Approaches", Mar. 2008, rPath, Inc., www.rpath.com, 9 pages.

Norman Lee Faus at al., U.S. Appl. No. 12/040,831, "Methods and Systems for Dynamically Building a Software Appliance", filed Feb. 29, 2008.

Ferris, U.S. Appl. No. 12/324,563, "Methods and Systems for Securing Appliances for Use in a Cloud Computing Environment", filed Nov. 26, 2008.

Ferris, U.S. Appl. No. 12/128,787, "Methods and Systems for Building Custom Appliances in a Cloud-Based Network", filed May 29, 2008.

\* cited by examiner

| NETWORK SERVICES CLOUD - 3 YEAR CONTRACT ||
|---|---|
| SOFTWARE RESOURCES:    CLOUD MANAGEMENT SYSTEM V.1<br>OPERATING SYSTEM V.4<br>TECH SUPPORT EXCLUDED    EMAIL SERVER V.3<br>WEB SERVER V.2 ||
| # OF VIRTUAL MACHINES SIMULTANEOUSLY INSTANTIATED | PRICE PER MONTH |
| 0 - 500 | $1,000.00 |
| 500 - 1000 | $1,500.00 |
|  |  |
|  |  |

FIG. 4

METHODS AND SYSTEMS FOR PRICING SOFTWARE INFRASTRUCTURE FOR A CLOUD COMPUTING ENVIRONMENT

FIELD

This invention relates generally to products and services, more particularly, to systems and methods for cloud computing related services and products.

DESCRIPTION OF WE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, when determining the usage of a cloud, the hardware usage of a particular virtual machine is measured. For example, when determining the cost for leasing cloud resources, a vendor of the cloud will measure the hardware resources, i.e. processor cycles, amount of memory, etc., used by a particular customer.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4 illustrates an exemplary record for storing the utilization of the software infrastructure, according to various embodiments;

DETAILED DESCRIPTION OF EMBODIMENTS

Figure 1:
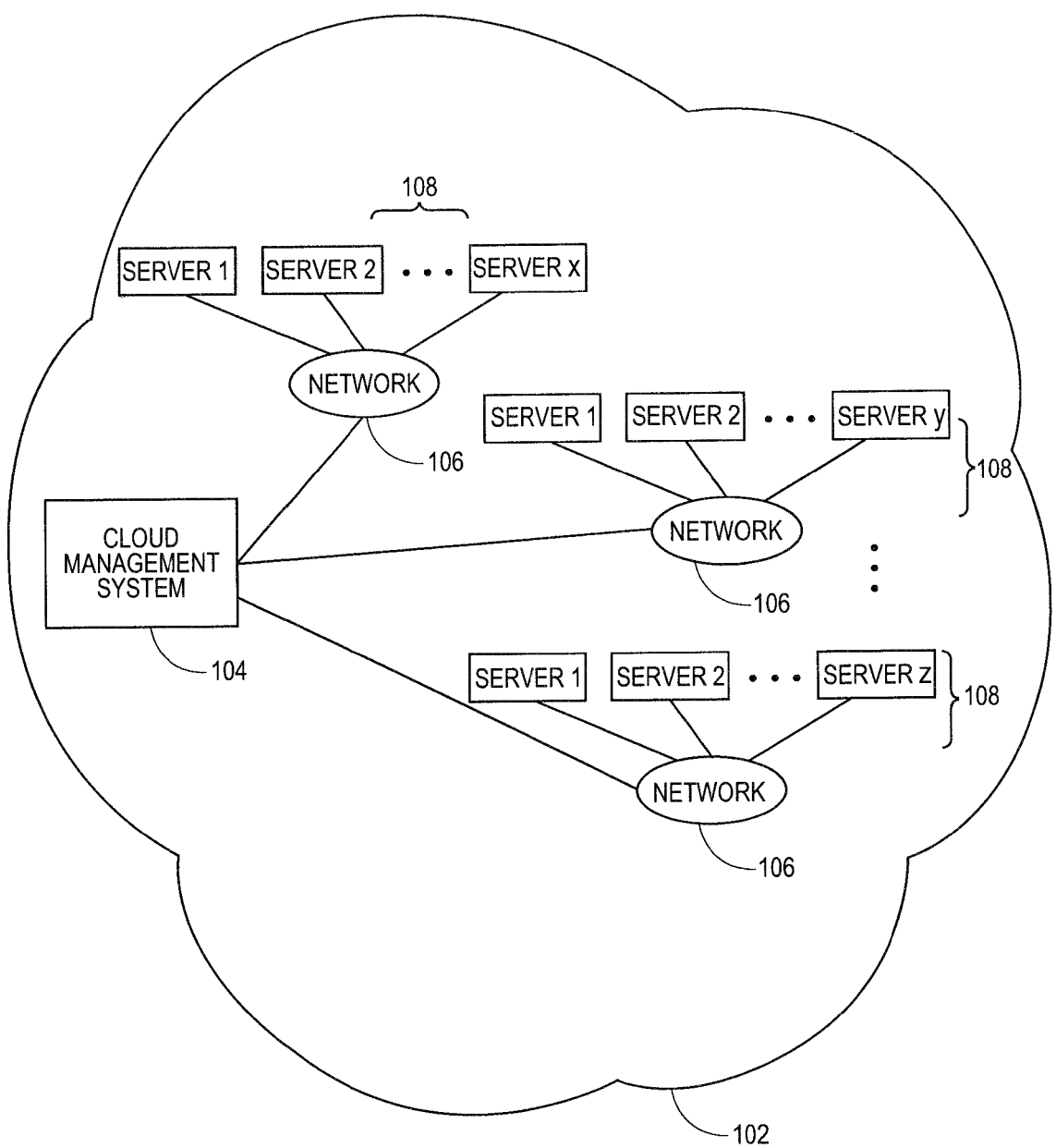
FIG. 1 illustrates an overall cloud system architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for building a software infrastructure of a cloud computing environment. More particularly, embodiments relate to platforms and techniques in which a software provider can provide and price the software infrastructure based on expected utilization and actual utilization of the cloud computing environment.

According to embodiments, a software provider system can be configured to provide and price software infrastructure for a cloud to a cloud provider based on expected utilization and actual utilization of the cloud. In particular, the software provider system can be configured to provide the software infrastructure of the cloud and technical support for the software infrastructure under a varying price structure which is dependent on the expected utilization and the actual utilization of the software infrastructure. The software provider system can be configured to determine the initial price of the software infrastructure based on the expected utilization of the cloud and a purpose of the cloud. Likewise, the software provider system can be configured to monitor the actual utilization of the software infrastructure, over time, in order to modify the initial price based on the actual utilization of the software infrastructure.

According to embodiments, the software provider system can be configured to include a pricing module. The pricing module can be configured to cooperate and communicate with the cloud provider to determine the software infrastructure required to support the cloud and to determine a price for the software infrastructure. In particular, the pricing module can be configured to provide an interface to receive a request for software infrastructure from the cloud provider. The request can include an expected utilization of the software infrastructure and a purpose of the cloud (services provided by the cloud, software resources to include in the cloud, etc.).

According to embodiments, the pricing module can be configured to determine the price for providing the software infrastructure and technical support for the software infrastructure based on the expected utilization of the software infrastructure, an actual utilization of the software infrastructure, and the purpose of the cloud. In particular, the pricing module can be configured to determine an initial price for providing the infrastructure based on the expected utilization and the purpose of the cloud and can be configured to determine various price reductions or increases if the actual utilization falls short or exceeds the expected utilization.

According to embodiments, once pricing terms are accepted, the software provider system can be configured to provide the software infrastructure to the cloud provider. Additionally, the software provider system can be configured to provide a metering tool for tracking actual utilization of the software infrastructure. The metering tool can be configured to monitor the software resources of the cloud to track the utilization of the software infrastructure. In particular, the metering tool can be configured to cooperate and communicate with the cloud management system to determine the software resources utilized by processes instantiated in the cloud and to track the type, number, and duration of the utilization of the software resources.

According to embodiments, the metering tool can be configured to store the actual utilization in a record and/or provide the actual utilization to the software provider system. The pricing module can be configured to compare the actual utilization to the expected utilization to determine if the initial price of the software infrastructure should be modified.

By providing software infrastructure based on utilization and purpose, the software provider system can provide software infrastructure specifically tailored for the cloud. As such, a cloud provider can enhance the flexibility, power, and reliability of the cloud environment. Additionally, by pricing based on the utilization of the software infrastructure instead of a single price for selling the software infrastructure, the software provider system can accurately price the software infrastructure based on all factors that affect the cost of providing the software infrastructure.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
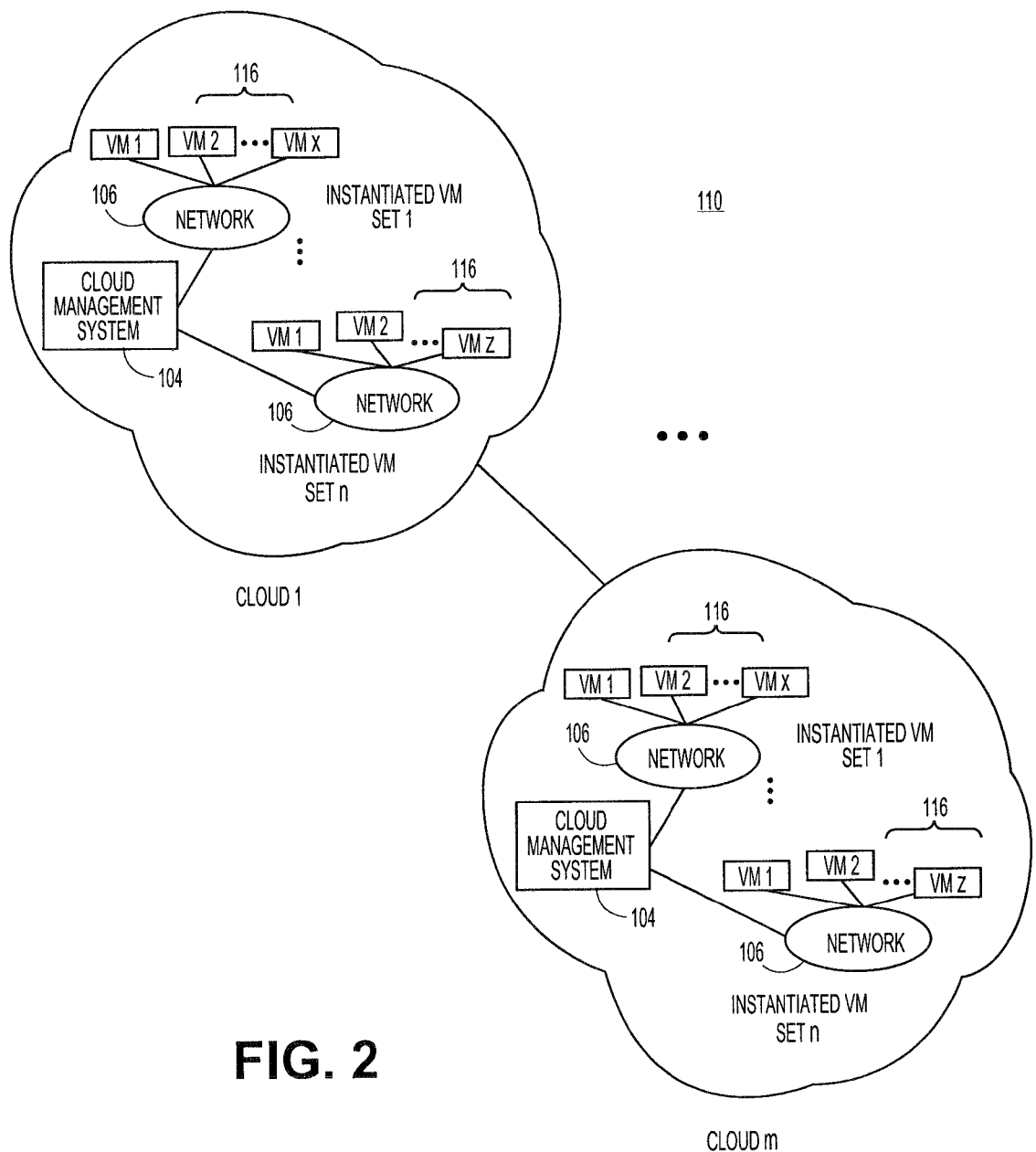
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can farther generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
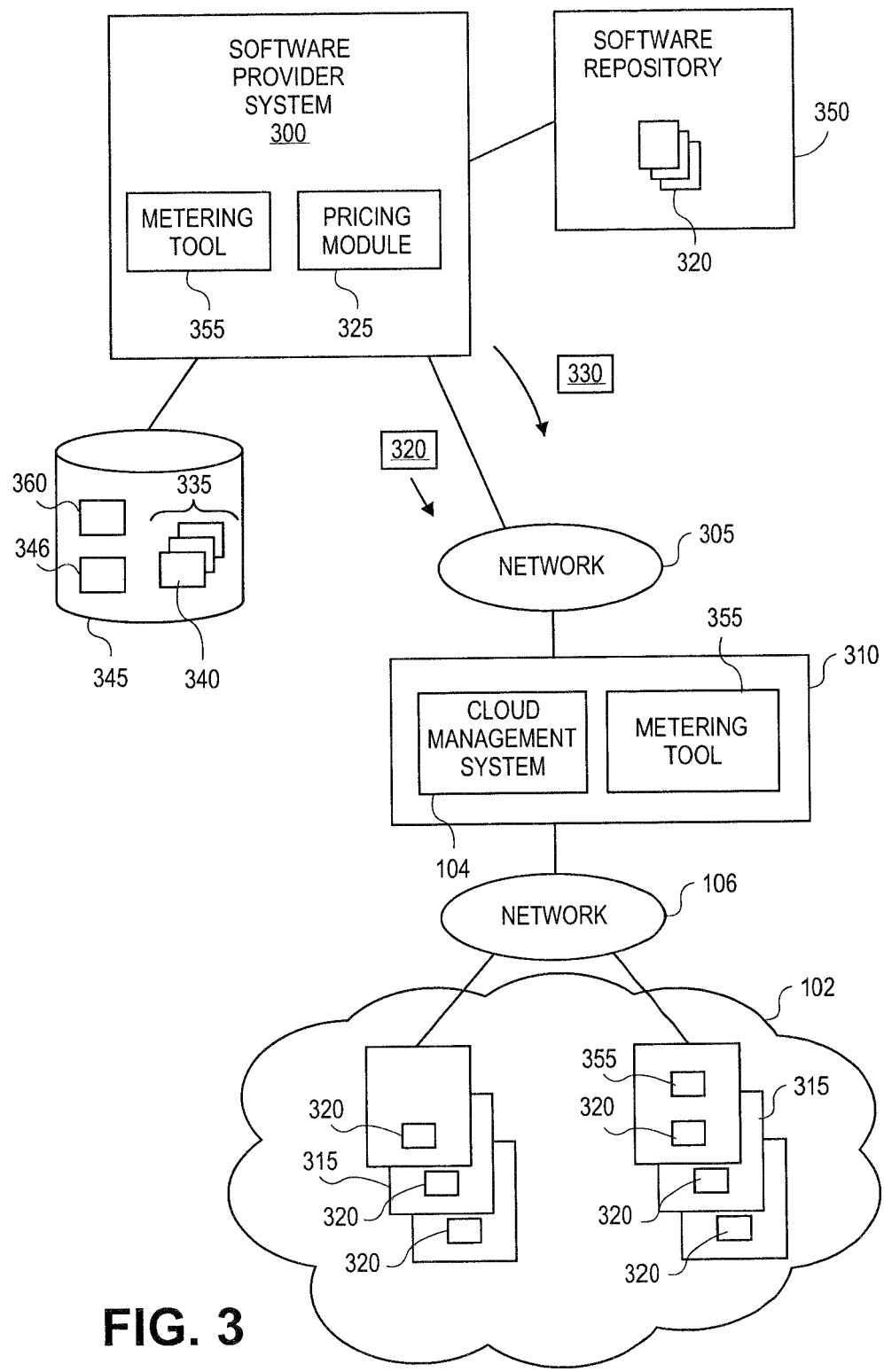
FIG. 3 illustrates an overall system in which a software provider can price software infrastructure based on utilization, according to various embodiments.

FIG. 3 illustrates aspects in which a cloud provider can communicate with a software provider system 300, via one or more networks 305, in order to build the cloud 102, according to various embodiments. While FIG. 3 illustrates various components of the cloud 102 and the software provider system 300, one skilled in the art will realize that components can be added or removed.

In embodiments, prior to providing services from the cloud 102, the provider of the cloud 102 must build the infrastructure of the cloud 102. For example, the provider of the cloud 102 can have a computing system 310 for supporting a cloud management system 104 and one or more computing systems 315, such as the set of resource servers 108 as described above, coupled to one or more networks 106. The computing system 310 can be any type of computing system capable of supporting the cloud management system 104, such as servers, laptops, desktops, and the like. Likewise, the computing system 315 can be any type of computing system to provide resources to the cloud 102, such as servers, laptops, desktops, and the like. The computing system 315 can include a number of hardware resources that are used to support virtual machines, software appliances, processes and the like in the cloud 102, such as such as processors, memory, network hardware and bandwidth, storage devices, etc.

In embodiments, prior to creation of the cloud 102, the cloud 102 can lack the software infrastructure to support the cloud 102. For example, the computing system 310 can lack the cloud management system 104 to manage to the cloud 102. Likewise, for example, the computing systems 315 can lack the software resources 320 that are used to support virtual machines, software appliances, processes and the like in the cloud 102. For instance, the software resources 320 can include operating systems, application programs, and the like.

In embodiments, the cloud 102 can be created for a variety of purposes depending on the provider of the cloud 102. For example, the cloud 102 can be owned and/or operated by a cloud vendor, such as AMAZON, in order to provide the services of the cloud 102 to subscribers and customers. Likewise, for example, the cloud 102 can be owned and/or operated by an entity (e.g. company, corporation, university etc.), and the resources of the cloud 102 can be used by the entity to support various computing processes. As such, the software resources 320, included in the computing systems 315, can depend on the particular usage of the cloud 102. For example, if the cloud 102 is operated by a cloud vendor, the software resources 320 can include operating systems, such as LINUX provided by Red Hat Corporation, and various application programs requested or typically desired by subscribers, such as middleware applications, web hosting applications, electronic mail (email) applications, and the like. Likewise, for example, if the cloud 102 is operated by an entity for internal use, the software resources 320 can include software resources 320 required to support the specific internal uses. For instance, the cloud 102 can be utilized by a corporation to perform simulations on a product and the software resources 320 can include operating systems and application programs to run the simulations.

In embodiments, the cloud provider can be configured to obtain the software infrastructure for the cloud 102 from a software provider operating the software provider system 300. The software provider can be any entity (company, corporation, etc.) that provides software infrastructure, such as the cloud management system 104 and the software resources 320, and provides technical support for the software infrastructure. For example, the software provider can be a software development and support company, such as RED HAT, Inc. The software provider system 300 can be implemented as any type of computing system such as servers, laptops, desktops, and the like.

In embodiments, the one or more networks 305 can be or include the Internet, or other public or private networks. The one or more or more networks 305 can be or include wired, wireless, optical and other network connections. One skilled in the art will realize that the one or more networks 305 can be any type of network, utilizing any type of communication protocol, to connect the computing systems.

In embodiments, the software provider system 300 can be configured to provide and price the software infrastructure for the cloud 102 to the cloud provider based on expected utilization, actual utilization, and purpose of the cloud 102. In particular, the software provider system 300 can be configured to provide the software infrastructure of the cloud 102 and technical support for the software infrastructure under a varying price structure which is dependent on the expected utilization of the software infrastructure, the actual utilization of the software infrastructure, and the purpose of the cloud. The software provider system 300 can be configured to determine the initial price of the software infrastructure based on the expected utilization of the cloud 102 and the purpose of the cloud 102. Likewise, the software provider system 300 can be configured to monitor the actual utilization of the software infrastructure in order to modify the initial price based on the actual utilization of the software infrastructure.

In embodiments, the software provider system 300 can be configured to include a pricing module 325. The pricing module 325 can be configured to cooperate and communicate with the cloud provider to determine the software infrastructure required to support the cloud 102 and determine the price for providing the software infrastructure. The pricing module 325 can be implemented as a software program that is configured to execute on the software provider system 300 or any other computing system. Likewise, the pricing module 325 can be implemented as a portion of other software programs configured to execute on the software provider system 300 or any other computing system. In either case, the pricing module 325 can be configured to include the necessary logic, commands, instructions, and protocols to perform the processes described below. In any implementation, the pricing module 325 can be written in any type of conventional programming language such as C, C++, JAVA, Perl, and the like. Additionally, the pricing module 325 can be stored in computer readable storage devices or media (CD, DVD, hard drive, portable storage memory, etc.) whether local to the software provider system 300 or remotely located.

In embodiments, the pricing module 325 can be configured to provide an interface 330 to receive a request for software infrastructure from the cloud provider. To achieve this, the pricing module 325 can be configured to include the necessary logic, commands, instructions, and protocols to generate and provide the interface 330 such as command line or graphical user interfaces (GUIs) to receive the request to for the software infrastructure from the cloud provider. Likewise, the pricing module 325 can be configured to allow the computing system 310 and software programs executing on the computing system 310 to provide the request for the software infrastructure. The pricing module 325 can be configured to include an application programming interface (API) to provide the interface 330 that allows the computing system 310 and software programs to call the pricing module 325 and provide the request.

In embodiments, the request can include the expected utilization of the software infrastructure and the purpose of the cloud 102. The expected utilization can include various parameters describing how the software infrastructure will be utilized such as an expected number of virtual machines simultaneously instantiated, an expected number of total of virtual machines to be instantiated during a time period, and the like. The purpose can include a description of the services that will be provided by the cloud 102, the type of software resources 320 to be included in the cloud 102, and the like.

For example, the cloud 102 can be operated by a cloud vendor that plans to support various virtual machines that provide network services. As such, the cloud provider can identify, in the request, that the purpose of the cloud 102 is to support network services and can specific the particular services to provide such as web site hosting, email hosting, application hosting, and the like. Likewise, in this example, the cloud provider can identify, in the request, the expected utilization such as 1000 virtual machines simultaneously instantiated.

In embodiments, once the request is received, the pricing module 325 can be configured to determine the price for providing the software infrastructure and technical support for the software infrastructure based on the expected utilization of the software infrastructure and the purpose of the cloud 102. In particular, the pricing module 325 can be configured to determine an initial price of providing the infrastructure based on the expected utilization and the purpose of the cloud 102 and various price reductions or increases if the actual utilization falls short or exceeds the expected utilization.

In embodiments, in order to determine the initial price and various price reductions or increases, the pricing module 325 can be configured to maintain a set 335 of price records 340. Each price record 340 in the set 335 can be configured to store multiple price levels, for a particular software infrastructure, purposes of the cloud, software resources provided to the cloud, and the like, where each price level corresponds to a utilization of software infrastructure. The multiple price levels can include the price for providing the software resources 320 and technical support for the software resources 320 for the particular purpose. The pricing module 325 can maintain the set 335 of price records 340 in a repository 345, such as a database. The repository 345 can be stored in computer readable storage devices or media (CD, DVD, hard drive, portable storage memory, etc.) whether local to the software provider system 300 or remotely located.

FIG. 4 illustrates an exemplary price record 400, according to various embodiments. As illustrated in FIG. 4, the price record 400 can include an entry 405 that identifies the software infrastructure, such as purpose (network infrastructure), software resources, technical support, and duration the software infrastructure will be provided (3 year contract basis) for which the price record 400 contains the various price levels. Additionally, the price record 400 can include entries 410 which identify the price level for various utilization of the software infrastructure. For example, the price levels can be structured according to a range of virtual machines simultaneously instantiated using the software infrastructure.

In embodiments, the pricing module 325 can determine the multiple price levels in each price record 340 based on cost of providing the software resources 320, cost of providing technical support for software resources 320, and a desired profit margin. The difference in the price levels associated with the utilization of the software resources 320 and technical support for the software resources 320 can represent the expected increase or decrease in cost of providing technical support when the utilization increases or decreases. Likewise, the multiple price levels contained in each record can be based on the length of time the software infrastructure will be provided. As such, the set 335 can contain different records 340 for the same software infrastructure but for different lengths of time. For example, the price levels for providing the software infrastructure can be less if the length of time for providing the software infrastructure is longer.

In embodiments, to determine the initial price and the price increases and reductions, the pricing module 325 can be configured to retrieve the particular price record 340 associated with the purpose provided in the request, for example, the services provided or software resources 320 desired. The pricing module 325 can be configured to search the particular price record 340 for the price level associated with the expected utilization provided in the request. The price module 325 can be configured to retrieve and to provide the price level associated with the expected utilization as the initial price. Likewise, the pricing module 325 can be configured to retrieve and to provide other pricing levels which can represent various price reductions or increases if the actual utilization falls short or exceeds the expected utilization. The pricing module 325 can be configured to provide the initial price and various price reductions or increases to the cloud provider via the interface 330. As such, the cloud provider can accept the price terms for receiving the software infrastructure from the software providing system 300.

For instance, in the above example, the pricing module 325 can retrieve the pricing record 400 and determine that the initial price, based on the expected utilization of 1000 simultaneous virtual machines, to the cloud vendor will be $1,500.00 per month for a 3 year contract. Likewise, the pricing module 325 can determine that the price will decrease to $1,000.00 per month if the actual utilization drops below 500 simultaneous virtual machines.

In embodiments, once the terms are accepted, the software provider system 300 can be configured to provide the software infrastructure to the cloud provider. Likewise, the pricing module 325 can be configured to store the terms for providing the software infrastructure in a sales record 346. The sales record 346 can include an identify of the cloud provider and the terms for providing the software infrastructure, such as the software resources 320 provided, the pricing record 340 utilized to determine the price, the initial-price, and the modification in price based on actual utilization.

In embodiments, to provide the software infrastructure, the software provider system 300 can be configured to maintain a software repository 350. The software repository 320 can be configured to store the software resources 320 provided by the software providing system 300, such as cloud management systems 104, operating systems, application programs, and the like. The software repository 320 can be any type of computing system or storage system configured to store the software resources 320 in any type of format.

In embodiments, to provide the software resources 320, the software provider system 300 can be configured to retrieve the particular software resources 320 for the cloud 102 from the software repository 350 and deliver the particular software resources 320 to the cloud 102. For example, the software provider system 300 can deliver the particular software resources 320 to the computing systems 310 and 315, via the network 305. Likewise, the software provider system 300 can deliver the particular software resources 320 to the computing systems 310 and 315, via physical computer readable storage devices and media, such as CD, DVD, portable memory devices, and the like. Additionally, the software provider system 300 can be configured to allow the computing systems 310 and 315, to directly acquire the particular software resources 320 from the software repository, via the network 305.

Additionally, the software provider system 300 can be configured to provide a metering tool 355 to the cloud 102 for metering actual utilization of the software infrastructure. The metering tool 355 can be configured to monitor the software resources 320 of the cloud 102 in order to track and record the actual utilization of the software infrastructure. In particular, the metering tool 355 can be configured to cooperate and communicate with the cloud management system 104 to determine the software resources 320 utilized by processes instantiated in the cloud and to track the type, number, and duration of the utilization of the software resources 320.

In embodiments, once the software infrastructure is provided, the cloud provider can begin providing services from the cloud 102. The cloud management system 104 can be configured to monitor, manage, and maintain the cloud 102. The cloud management system 104 can be configured to allocate the resources (hardware resources and software resources 320) of the computing systems 315 in order to allow the usage of the cloud 102. For example, the cloud management system 104 can be configured to include a virtual machine monitor. The virtual machine monitor can be configured to allocate the resources of the computing systems 315, instantiate virtual machines on the computing systems 315, monitor the virtual machines during their instantiation, and terminate the virtual machines once use is finished. The virtual machine monitor can be any type of conventional open-source or proprietary virtual machine monitor, such as Xen, that allows several guest operating systems to be run on the same hardware resources. Likewise, the cloud management system 104 can be configured to instantiate, monitor, and terminate other processes in the cloud 102, such as software appliances, individual applications, and other processes.

In embodiments, to determine and track the utilization, the metering tool 355 can be configured to cooperate with the cloud management system 104 and other components of the cloud management system 104, such as the virtual machine monitor, to determine the software resources utilized in the cloud and track the actual utilization of the software resources. Likewise, the metering tool 355 can be configured to directly query and monitor the computing systems 315 to determine and track the utilization of the software resources of the cloud 102. For instance, the metering tool 355 can be configured to cooperate and communicate with operating systems running on the computing systems 315 in order to determine when the computing resources of the computing systems 315 are utilized.

In embodiments, the metering tool 355 can be implemented as an application program that is configured to cooperate with the components of the cloud management system 104 and configured to directly query and monitor the computing system 315 in order to determine the resources that are utilized in the cloud 102. As such, the metering tool 355 can be configured to include the necessary logic, commands and instructions to communicate with the components of the cloud management system 104, such as the virtual machine monitor. Likewise, the metering tool 355 can be configured to include the necessary logic, commands and instructions to communicate with the hardware resources of the computing systems 315 and the software resources 320, such as the operating system and applications programs. The metering tool 355 can be implemented as a component of the cloud management system 104. Likewise, the metering tool 355 can be implemented as a standalone application program that can communicate with the cloud management system 104. In any implementation, the metering tool 355 can be written in any type of conventional programming language such as C, C++, JAVA, Perl, and the like.

In embodiments, one or more instances of the metering tool 355 can operate in the cloud 102 or in the software provider system 300. For instance, the software provider system 300 can be configured to include one instance of the metering tool 355 in order to coordinate and control the determination and tracking of the utilization of the resources of the cloud 102. Additionally, for instance, the cloud management system 104 can be configured to include (or communicate with, if separate) one instance of the metering tool 355 in order to coordinate and control the determination and tracking of the utilization of the resources of the computing system 315. Likewise, for example, one or more instances of the metering tool 355 can be located on the computing systems 315. When located on the computing systems 315, the metering tools 355 can be configured to query and monitor the computing systems 315 to determine and track resource utilization and configured to report the resource utilization to the instance of the metering tool 355 located in (or communicating with) the cloud management system 104 and/or the software provider system 300.

In embodiments, the metering tool 355 can be configured to determine and track the utilization of the hardware resource of the cloud 102. In particular, the metering tool 355 can be configured to actively monitor the hardware resources of the computing systems 315 and track the utilization of the hardware resources. For example, as virtual machines, software appliances, and other processes use the hardware resources of the computing systems 315, the metering tool 355 can monitor the hardware resources to determine the type (processors, memory, storage, network devices), the amount (number of processing cycles, amount of memory, amount of storage, amount of network bandwidth), and the duration (seconds, minutes, hours, days) the hardware resources are utilized.

In embodiments, the metering tool 355 can be configured to determine and track the utilization of the software resources 320 by processes instantiated in the cloud 102. In particular, the metering tool 355 can be configured to cooperate and communicate with the cloud management system 104 in order to determine the type of software resources 320 utilized, the number of instances of each type of software resources 320 utilized, and the duration each instance of software resources 320 is utilized. Likewise, the metering tool 355 can be configured to cooperate and communicate directly with the computing system 315 in order to determine the type of software resources 320 utilized, the number of instances of each type of software resources 320 utilized, and the duration each type of software resources 320 is utilized. For example, the metering tool 355 can be configured to determine the types and numbers of host and/or guest operating systems (LINUX, WINDOWS, etc) and applications programs (middleware applications, web hosting applications, email applications, etc.) that are utilized and the duration (seconds, minutes, hours, days) that each type is utilized.

In embodiments, for example, the metering tool 355 can be configured to determine and track the number and duration of virtual machines instantiated in the cloud and the software resources 320 utilized in the virtual machines instantiated in the cloud 102. To achieve this, the metering tool 355 can be configured to communicate with the virtual machine monitor to determine and track the software resources 320 utilized in the virtual machines. For instance, when a virtual machine is instantiated, the virtual machine monitor can notify the metering tool 355 that a virtual machine has been instantiated. The notification can include an identification of the virtual machine, the type of the host operating system, and the type of the guest operating system created for the virtual machine. As software resources 320 are utilized in the virtual machine, the virtual machine monitor can notify the metering tool 355 of the type of software resources 320, the start time of the software resources 320 utilization, and the end time of the software resources 320 utilization. As such, the metering tool 355 can track the duration that particular types of software resources 320 that are utilized by the virtual machines. Likewise, the virtual machine monitor can notify the metering tool 355 of the start time and termination time of the virtual machine. As such, the metering tool 355 can determine and track the duration of the utilization of the guest operating system and the host operating system and the number of virtual machines instantiated simultaneously.

In embodiments, for example, the metering tool 355 can be configured to determine and track the software resources 320 utilized in other processes instantiated in the cloud 102, such as software appliances and individual application programs. In particular, the metering tool 355 can be configured to communicate with the cloud management system 104 and monitor the computing systems 315 to determine and track the utilization of the software resources 320. For instance, when the cloud management system 104 instantiates a software appliance in the cloud 102, the cloud management system 104 can notify the metering tool 355 of the software resources 320 included in the appliance (e.g. operating system and application programs), the start time of the appliance, and the end time of the appliance. Likewise, for instance, the metering tool 355 can monitor the computing systems 315 for software appliances being started and ended on the computing systems 315 and can track the number of software appliances running and the duration that the software appliance runs on the computing systems 315. As such, the metering tool 355 can track the duration that the software resources 320 included in the software appliance are utilized.

Likewise, for instance, the metering tool 355 can determine and track when a particular software resource 320 is individually utilized on the computing systems 315. The metering tool 355 can be configured to communicate with operating systems running on the computing systems 315 in order to identify when the particular software resource 320 is utilized and the duration the software resource 320 is utilized.

In embodiments, as the metering tool 355 determines and tracks resource utilization, the metering tool 355 can be configured to store the utilization of the software resources 320 in a software record 360. The software record 360 can be configured to store the type of the software resources 320 utilized, the number of software resources 320 simultaneously utilized, and the duration the software resources 320 are utilized. The metering tool 355 can be configured to maintain the software record 360 in the repository 345.

In embodiments, the pricing module can be configured to compare the actual utilization to the expected utilization, over time, to determine if the initial price of the software infrastructure should be modified. In particular, the pricing module 325 can be configured to identify the actual utilization of the software infrastructure, periodically, for example monthly. To identify the actual utilization, the pricing module 325 can be configured to access the software record 360 to identify and retrieve the actual utilization for the cloud 102 or a specific period of time, for example a particular month. Once retrieved, the pricing module 325 can be configured to compare the actual utilization to the expected utilization stored in the sales record 346. If the actual utilization does not match the expected utilization, the pricing module 325 can be configured to modify the initial price based on the terms stored in the sales record 346. The pricing module 325 can be configured to provide an indication of a modification in the price to the cloud provider via the interface 330.

Figure 5:
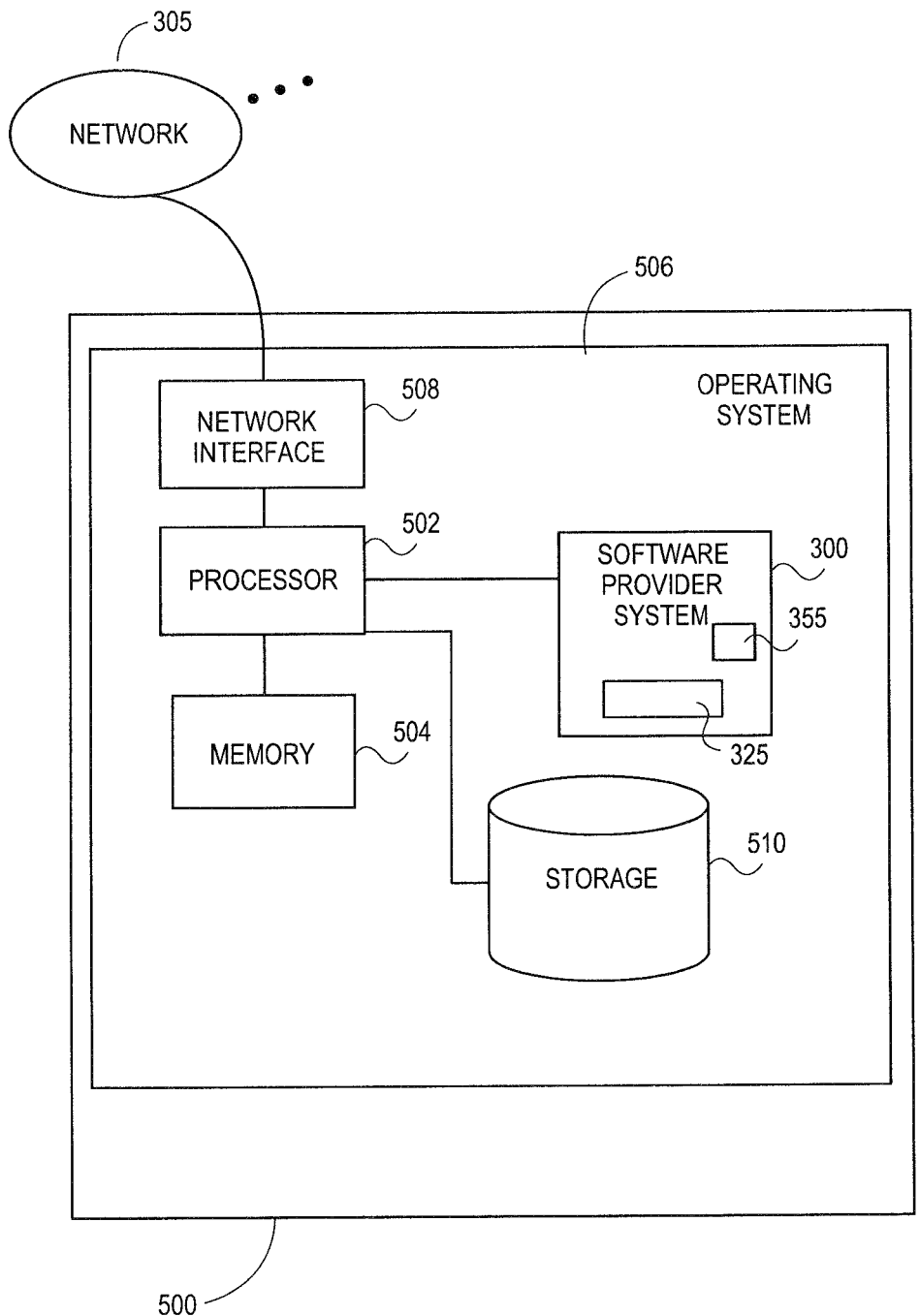
FIG. 5 illustrates an exemplary hardware configuration for a computing system implementing a software provider system and metering tool, according to various embodiments.

FIG. 5 illustrates an exemplary diagram of hardware and other resources that can be incorporated in a computing system 500, which can implement software provider system 330, and configured to communicate with the clouds 102 via one or more networks 305, according to embodiments. In embodiments as shown, the computing system 500 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 500 also communicates with one or more computer readable storage medium 510, such as hard drives, optical storage, and the like, which can store the repository 325. Processor 500 further communicates with network interface 508, such as an Ethernet or wireless data connection, which in turn communicates with one or more networks 305, such as the Internet or other public or private networks.

Processor 500 also communicates with the software provider system 300, which can include the pricing tool 325 and the metering tool 355, to execute control logic and allow for pricing the software infrastructure as described above and below. Other configurations of the computing system 500, associated network connections, and other hardware and software resources are possible.

While FIG. 5 illustrates the computing system 500 as a standalone system including a combination of hardware and software, the computing system 500 can include multiple systems operating in cooperation. The software provider system 300, which can include the pricing tool 325 and the metering tool 355, can be implemented as a software application or program capable of being executed by the computing system 500, as illustrated, or other conventional computer platforms. Likewise, the pricing tool 325 and the metering tool 355, can also be implemented as a software module or program module capable of being incorporated in other software applications and programs. In either case, the software provider system 300, the pricing tool 325 and the metering tool 355 can be implemented in any type of conventional proprietary or open-source computer language. When implemented as a software application or program code, the software provider system 300, the pricing tool 325 and the metering tool 355 can be stored in a computer readable storage medium, such as storage 510 accessible by the computing system 500. Likewise, during execution, a copy of the software provider system 300, the pricing tool 325 and the metering tool 355 can be stored in the memory 504.

Figure 6:
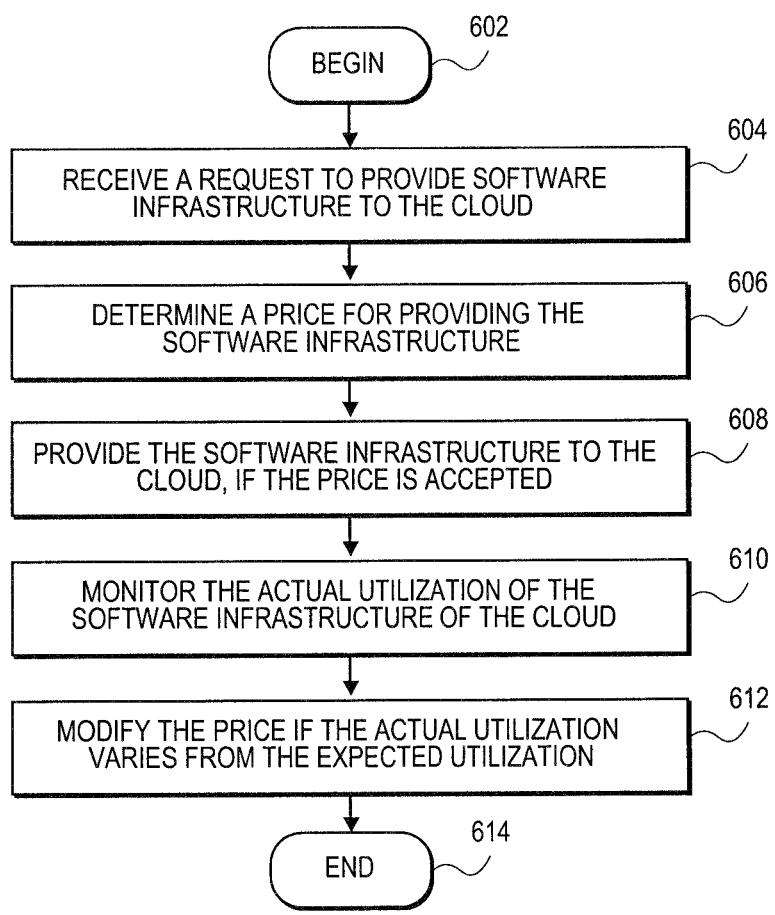
FIG. 6 illustrates a flowchart of an exemplary process for pricing software infrastructure of a cloud, according to various embodiments.

FIG. 6 illustrates a flow diagram of an exemplary process for pricing cloud infrastructure, according to embodiments. In 602, processing can begin. In 604, the software provider system 300 can receive a request to provide software infrastructure for a cloud. For example, the pricing module 325 can provide an interface 330 to receive the request. The request can include an expected utilization and a purpose of the cloud 102.

In 606, the software provider system 300 can determine a price for providing the software infrastructure. For example, the pricing module 325 can determine an initial price of providing the infrastructure based on the expected utilization and the purpose of the cloud 102 and various price reductions or increases if the actual utilization falls short or exceeds the expected utilization. In order to determine the initial price and various price reductions or increases, the pricing module 325 can maintain a set 335 of price records 340. Each price record 340 in the set 335 can be configured to store multiple price levels, for a particular software infrastructure, purposes of the cloud, software resources provided to the cloud, and the like, where each price level corresponds to a utilization of software infrastructure. The multiple price levels can include the price for providing the software resources 320 and technical support for the software resources 320 for the particular purpose. The determined price can be stored in a sales record 346.

In 608, the software provider system 300 can provide the software infrastructure to the cloud 102, if the price is accepted. For example, the software provider system 300 can deliver particular software resources 320 to the computing systems 310 and 315, via the network 305. Likewise, the software provider system 300 can deliver the particular software resources 320 to the computing systems 310 and 315, via physical computer readable storage devices and media, such as CD, DVD, portable memory devices, and the like. Additionally, the software provider system 300 allow the computing systems 310 and 315, to directly acquire the particular software resources 320 from the software repository, via the network 305.

In 610, the software provider system 300 can monitor the actual utilization of the software infrastructure of the cloud 102. For example, the software provider system 300 can utilize the metering tool 355 to monitor the actual utilization of the software infrastructure over time. The metering tool 355 can store the actual utilization in a software record 360.

In 612, the software provider system 300 can modify the price if the actual utilization varies from the expected utilization. For example, the pricing module 325 can identify the actual utilization of the software infrastructure, periodically, for example monthly. To identify the actual utilization, the pricing module 325 can access the software record 360 to identify and retrieve the actual utilization for the cloud 102 or a specific period of time, for example a particular month. Once retrieved, the pricing module 325 can compare the actual utilization to the expected utilization stored in the sales record 346. If the actual utilization does not match the expected utilization, the pricing module 325 can modify the initial price based on the terms stored in the sales record 346.

In 614, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:
1. A method comprising:
  receiving a request to provide a software resource for a cloud, the request comprising an expected number of instances of the software resource to be simultaneously instantiated;

determining an initial price for providing the software resource based on the expected number of instances;

monitoring the software resource to determine an actual number of instances of the software resource that are simultaneously instantiated; and determining, by a processing device, a modification of the initial price upon an occurrence of the actual number of instances varying from the expected number of instances.

2. The method of claim 1, the method further comprising:
providing the software resource to the cloud.

3. The method of claim 2, wherein the providing the software resource, comprises:
delivering the software resource over a network.

4. The method of claim 1, wherein the request further comprises at least one of a purpose of the cloud and an identification of the software resource.

5. The method of claim 1, wherein determining the initial price for providing the software resource and the modification of the initial price based on the actual number of instances, comprises:

maintaining a record of price levels associated with ranges of utilization;

comparing the expected number of instances to the ranges of utilization to determine the price level; and setting the price level as the initial price.

6. The method of claim 5, wherein the new price is determined when the actual number of instances falls outside a range of utilization used to determine the price level.

7. The method of claim 1, wherein the expected number of instances comprises a number of virtual machines simultaneously instantiated in the cloud.

8. A non-transitory computer readable storage medium including instructions that, when executed by a processing device, cause the processing device to perform a method comprising:

receiving a request to provide a software resource for a cloud, the request comprising an expected number of instances of the software resource to be simultaneously instantiated;

determining an initial price for providing the software resource based on the expected number of instances;

monitoring the software resource to determine an actual number of instances of the software resource that are simultaneously instantiated; and determining, by the processing device, a modification of the initial price upon an occurrence of the actual number of instances varying from the expected number of instances.

9. The computer readable storage medium of claim 8, the method further comprising:
providing the software resource to the cloud.

10. The computer readable storage medium of claim 9, wherein the providing the software resources, comprises:
delivering the software resource over a network.

11. The computer readable storage medium of claim 8, wherein the request further comprises at least one of a purpose of the cloud and an identification of the software resource.

12. The computer readable storage medium of claim 8, wherein determining the initial price for providing the software resource and the modification of the initial price based on the actual number of instances, comprises:

maintaining a record of price levels associated with ranges of utilization;

comparing the expected number of instances to the ranges of utilization to determine the price level; and setting the price level as the initial price.

13. The computer readable storage medium of claim 12, wherein the new price is determined when the actual number of instances falls outside a range of utilization used to determine the price level.

14. The computer readable storage medium of claim 8, wherein the expected number of instances comprises a number of virtual machines simultaneously instantiated in the cloud.

15. A system comprising:

a network interface to a cloud of computing systems; and a processing device communicating with the network interface and executing a software provider system, the software provider system being configured to:

receive a request to provide a software resource for the cloud, the request comprising an expected number of instances of the software resource to be simultaneously instantiated;

determine an initial price for providing the software resource based on the expected number of instances;

monitor the software resource in the cloud, via the network interface, to determine an actual number of instances of the software resource that are simultaneously instantiated; and determine a modification of the initial price upon an occurrence of the actual number of instances varying from the expected number of instances.

16. The system of claim 15, the software provider system being further configured to:
deliver the software resource via the network interface.

17. The system of claim 15, wherein the request further comprises at least one of a purpose of the cloud and an identification of the software resource.

18. The system of claim 15, wherein determining the initial price for providing the software resource and the modification of the initial price based on the actual number of instances, comprises:

maintaining a record of price levels associated with ranges of utilization;

comparing the expected number of instances to the ranges of utilization to determine the price level; and setting the price level as the initial price.

19. The system of claim 18, wherein the new price is determined when the actual number of instances falls outside a range of utilization used to determine the price level.

20. The system of claim 15, wherein the expected number of instances comprises a number of virtual machines simultaneously instantiated in the cloud.

* * * * *